United States Patent [19]
Lloyd et al.

[11] Patent Number: 6,116,960
[45] Date of Patent: Sep. 12, 2000

[54] CIGARETTE LIGHTER ADAPTER

[75] Inventors: Grant H. Lloyd; John Daniel Bean, both of Lawrenceville, Ga.

[73] Assignee: Motorola, Inc., Schaumburg, Ill.

[21] Appl. No.: 09/127,801

[22] Filed: Aug. 2, 1998

[51] Int. Cl.[7] .................................................. H01R 24/04
[52] U.S. Cl. ........................................... 439/668; 439/218
[58] Field of Search .................................. 439/166, 170, 439/218, 668, 669

[56] References Cited

U.S. PATENT DOCUMENTS

| | | | |
|---|---|---|---|
| 3,870,857 | 3/1975 | Horwitt | 219/264 |
| 5,158,484 | 10/1992 | Chou | 439/668 |
| 5,230,641 | 7/1993 | Wharton | 439/668 |
| 5,431,585 | 7/1995 | Fan | 439/668 |
| 5,626,496 | 5/1997 | Hahn | 439/668 |

*Primary Examiner*—Tulsidas C Patel
*Attorney, Agent, or Firm*—Philip H. Borrus, IV

[57] ABSTRACT

A one-piece cigarette lighter adapter is described which comprises a barrel for insertion into a cigarette lighter socket, which barrel has a deep groove and a shallow groove, and a slip-ring which fits over the barrel, which slip-ring has a ridge on its inner circumference, which ridge can be seated in either the deep groove or the shallow groove by rotation of the slip ring about the barrel. The one-piece cigarette lighter adapter can fit into both sizes of international cigarette lighter adapter receptacles, without recourse to an easily misplaced separate spacing element.

1 Claim, 3 Drawing Sheets

CIGARETTE LIGHTER ADAPTER

TECHNICAL FIELD

This invention relates in general to electrical accessories and more particularly to plugs of the type intended for installation for cigar lighter socket or receptacle mounted in the dashboard or other panel of a motor vehicle or boat.

BACKGROUND OF THE INVENTION

Accessory plugs used for installation in the cigar lighter socket generally have a cylindrical body which telescopes into the socket. (A cigar lighter socket is also known as a cigarette lighter socket). The body in turn carries a contact or plunger at its inner end for engagement with the head of the hot stud of the socket. The plug body usually has a side terminal in the form of a flat plug, which electrically contacts the inner surface of the socket to complete the electrical circuit. U.S. Pat. No. 3,870,857, dated Mar. 11, 1975, issued to L. G. Horwitt illustrates and describes a typical cigar lighter and socket assembly as commonly employed in automotive and marine vehicles. The socket is constituted as an electrically grounded well, with an electrically hot stud insulatedly mounted therein. The stud carries bi-metallic fingers by which electrical connection to the heaping element cup of the ignition plug is established when the igniting unit is inserted in the well. While plugs of this kind have met with wide acceptance in the field, and operate in a generally satisfactory manner, a number of drawbacks have become apparent. Due to the sliding fit between the plug body and the walls of the socket, the contact pressure at the pin is limited to that of the frictional engagement and plug and socket walls. Since the cigarette lighter socket defers in size depending upon the country of manufacture of a vehicle, sometimes a plug body is not seated correctly, therefore electrical contacts can be erratic.

Therefore is a need for a cigarette lighter adapter with improved seating capabilities.

DETAILED DESCRIPTION OF THE PREFERRED EMBODIMENT

The present invention is a cigarette lighter adapter comprising a barrel for insertion into a cigarette lighter socket, and a slip-ring which fits around the barrel. The barrel has a deep groove and a shallow groove running parallel to the barrel. The slip-ring has a ridge on its inner circumference, running parallel to the barrel, which ridge can be seated in either the deep groove or the shallow groove. The ring may be rotated to seat the ridge in either the shallow groove or the deep groove, changing the outer circumference of the slip ring. This allows the slip ring to make a snug fit with either the large diameter cigarette lighter receptacle in, for example, a German car, or the smaller cigarette lighter receptacle in, for example, a Japanese car. This, with the present invention, both of the international sizes of cigarette lighter receptacles can be fitted with a one-part adapter.

Cigarette (or cigar) lighter adapter receptacles come in two sizes internationally, with one size that is about one millimeter larger in diameter than the other. The larger receptacle is about twenty-two millimeters in diameter, and the smaller size is about twenty-one millimeters in diameter. Currently, cigarette lighter adapters are sold with an extra piece that the user must slid into place in order for the cigarette lighter adapter to function properly with larger diameter receptacles. This extra piece is difficult to assemble for the user, and also can be easily misplaced, resulting in great dissatisfaction to the user. The present invention allows one cigarette lighter adapter to function with the two different size receptacles while eliminating the need for a separate adapter element. The present invention accomplishes this goal without adding extra costs to the product.

Figure 1:
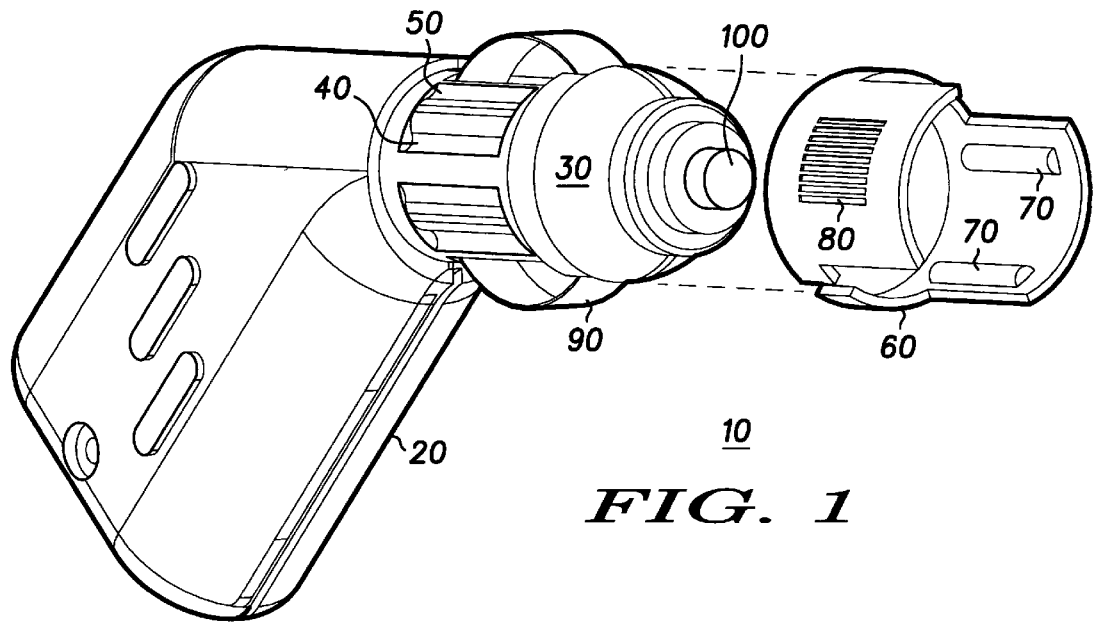
FIG. 1 is a perspective view of the cigarette lighter adapter of the present invention, in a pre-assembled state.
Figure 2:
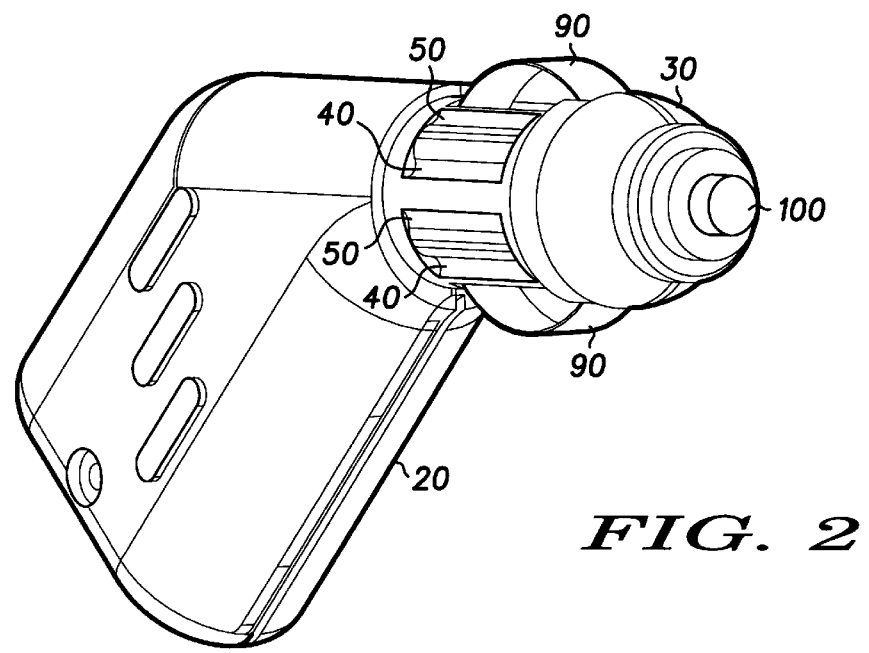
FIG. 2 is a perspective view of the cigarette lighter adapter of the present invention after assembly.
Figure 3:
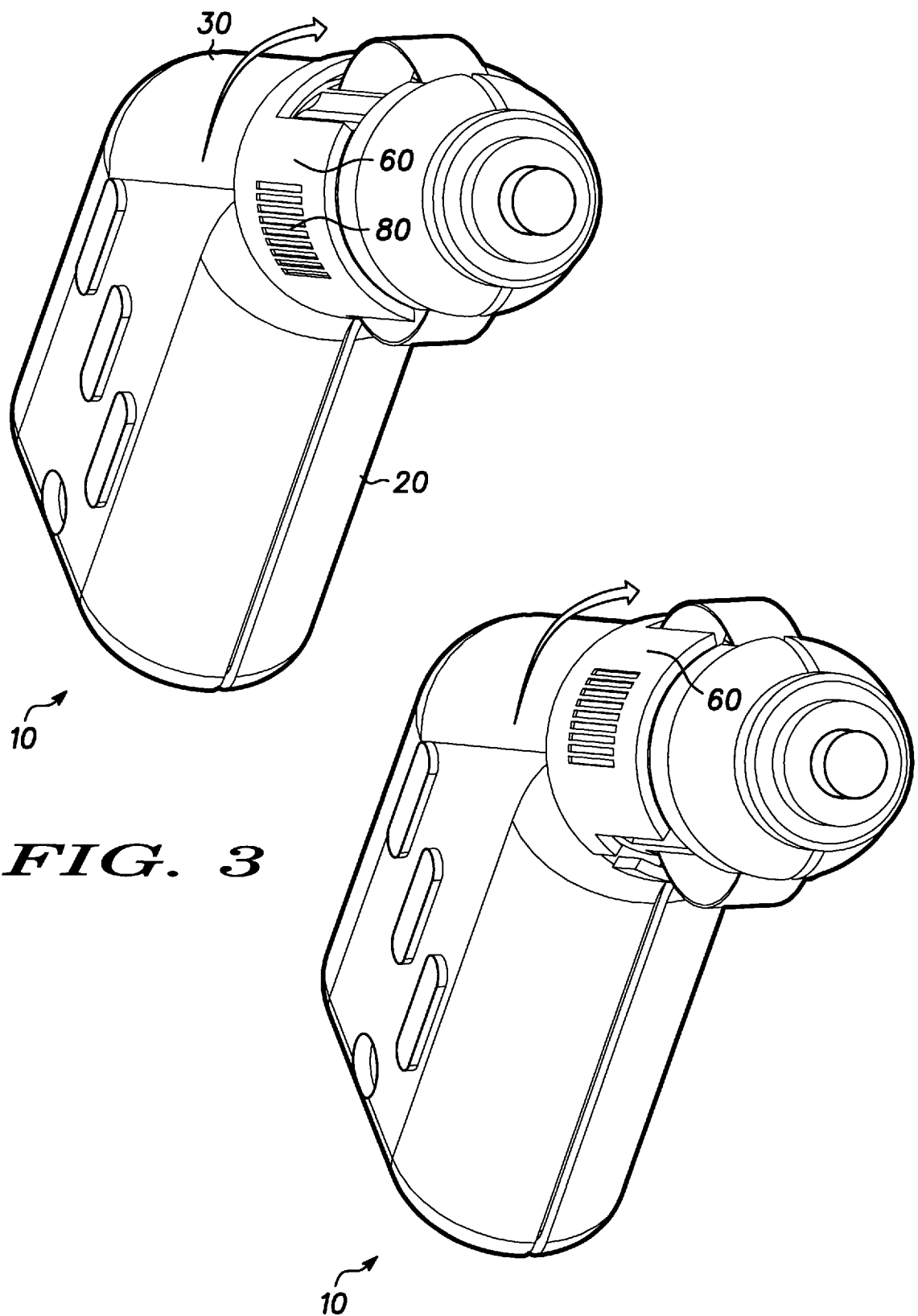
FIG. 3 is an end-on cut-away view of the barrel of the cigarette lighter adapter of the present invention.
Figure 4:
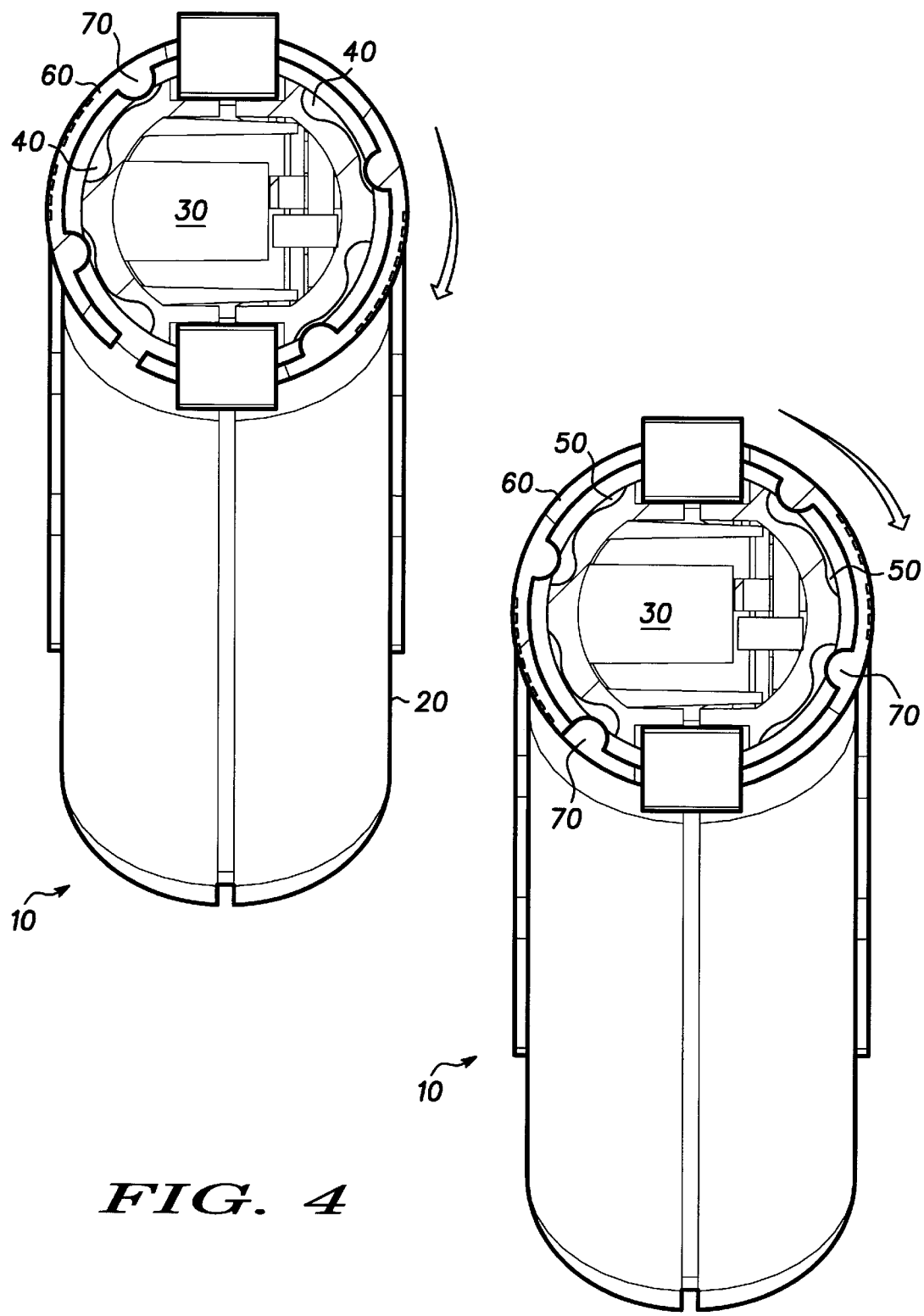
FIG. 4 is an end-on cut-away view of the barrel of the cigarette lighter adapter of the present invention showing the slip ring surround the barrel.

FIG. 1 shows a perspective view of the cigarette lighter adapter (10) of the present invention. The cigarette lighter adapter (10) comprises a barrel (30), a stock (20), and a slip-ring (60) [not shown in this figure]. Not shown is the electronic circuitry in the interior of the cigarette lighter adapter, or the electrical cord which connects to the stock (20). The electronic circuitry, of course, may take many forms. Located on the barrel (30) of the cigarette adapter lighter are one or more deep grooves (40) and one or more shallow grooves (50). Each shallow groove (50) may be, for example, one millimeter shallower than each deep groove (40). Slip-ring (60) has in its inner circumference one or more ridges (70), as shown in FIG. 2. During manufacture of the cigarette lighter adapter (10), slip ring (60) is placed on the barrel (30) of the cigarette lighter adapter. When the ridge (70) is placed in a shallow groove (50) the outer circumference of the slip-ring (60) is less than if the ridge (70) is rotated to seat itself in the deep groove (40). Also shown in FIGS. 1 and 2 are optional finger grips (80) on the slip-ring, and standard spring metal contacts (90) and contact button (100).

The cigarette lighter adapter of the present invention may be made of any suitable durable material such as wood, leather, or plastic. The cigarette lighter adapter stock and barrel may be made in mating frame halves, which may be bonded or fastened together with snaps.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A cigarette lighter adapter system comprising: (a) barrel for insertion into a cigarette lighter socket, wherein said barrel has a deep groove and a shallow groove; and (b) a slip-ring which fits over the barrel, wherein said slip-ring has a ridge on its inner circumference, wherein said ridge can be seated in either the deep groove or the shallow groove by rotation of the slip ring about the barrel.

* * * * *

UNITED STATES PATENT AND TRADEMARK OFFICE
CERTIFICATE OF CORRECTION

PATENT NO : 6,116,960
DATED : September 12, 2000
INVENTOR(S) : Lloyd, et al.

It is certified that error appears in the above-identified patent and that said Letters Patent are hereby corrected as shown below:

Attorney, Agent or Firm, reads "Borrus" should be --Burrus--.

Signed and Sealed this

Twenty-ninth Day of May, 2001

Attest:

NICHOLAS P. GODICI

*Attesting Officer*    *Acting Director of the United States Patent and Trademark Office*